United States Patent
Yamaguchi (10) Patent No.: US 8,649,781 B2
(45) Date of Patent: Feb. 11, 2014

(54) SYSTEM AND METHOD FOR GROUP-BASED MONITORING OF MOBILE OBJECTS USING A WIRELESS COMMUNICATION NETWORK

(75) Inventor: Yuuichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 699 days.

(21) Appl. No.: 12/280,203

(22) PCT Filed: Feb. 9, 2007

(86) PCT No.: PCT/JP2007/052336
§ 371 (c)(1),
(2), (4) Date: Aug. 21, 2008

(87) PCT Pub. No.: WO2007/097210
PCT Pub. Date: Aug. 30, 2007

(65) Prior Publication Data
US 2010/0216487 A1      Aug. 26, 2010

(30) Foreign Application Priority Data

Feb. 22, 2006   (JP) ................................ 2006-044613

(51) Int. Cl.
*H04M 3/42*       (2006.01)
(52) U.S. Cl.
USPC ..................... 455/416; 455/404.1; 455/414.1; 455/420; 455/456.1; 455/463; 370/328; 370/260; 379/205.01; 379/206.01; 379/207.01
(58) Field of Classification Search
USPC ........ 455/404.2, 456.1, 421, 404.1, 416, 410, 455/414.1, 420, 445, 463; 119/720; 340/573.1; 370/328–338, 260; 379/202.01–207.01
See application file for complete search history.

(56) References Cited

U.S. PATENT DOCUMENTS

| | | | | |
|---|---|---|---|---|
| 5,857,433 | A | * | 1/1999 | Files ............................. 119/720 |
| 8,380,158 | B2 | * | 2/2013 | McCulloch ................ 455/404.1 |
| 2002/0177428 | A1 | * | 11/2002 | Menard et al. ................ 455/404 |
| 2005/0031102 | A1 | * | 2/2005 | Kraus et al. ................ 379/114.2 |

(Continued)

FOREIGN PATENT DOCUMENTS

| | | |
|---|---|---|
| EP | 1589778 A2 | 10/2005 |
| EP | 1589779 A2 | 10/2005 |

(Continued)

OTHER PUBLICATIONS

International Search Report for PCT/JP2007/052336 mailed Mar. 20, 2007.

(Continued)

*Primary Examiner* — Quan M Hua
(74) *Attorney, Agent, or Firm* — Sughrue Mion, PLLC (57) ABSTRACT

A GPS mobile terminal (2) that a person (1) carries monitors position information on a dog (3) to whom a GPS terminal (4) is attached. When the person (1) and the dog (3) are separated more than a preset distance, the GPS mobile terminal (2) that the person (1) carries uses PoC communication enabling intragroup communication such as a transceiver to make a call request to mobile terminals (6, 7, 8) of all guardians belonging to any one of a plurality of groups (A, B, C) made up of the guardians. When there is a response from a group of the guardians, the communication is enabled in the group, so that the guardians can guide the person (1) to a safe place.

11 Claims, 7 Drawing Sheets

(56) References Cited

U.S. PATENT DOCUMENTS

| | | |
|---|---|---|
| 2005/0151642 A1* | 7/2005 | Tupler et al. .............. 340/539.18 |
| 2005/0197096 A1 | 9/2005 | Yang et al. |
| 2006/0053208 A1* | 3/2006 | Laurila et al. ................. 709/206 |

FOREIGN PATENT DOCUMENTS

| | | |
|---|---|---|
| JP | 11180254 A | 7/1999 |
| JP | 2000115397 A | 4/2000 |
| JP | 2000215374 A | 8/2000 |
| JP | 2000341402 A | 12/2000 |
| JP | 2001014592 A | 1/2001 |
| JP | 2002057817 A | 2/2002 |
| JP | 2002159056 A | 5/2002 |
| JP | 2002281694 A | 9/2002 |
| JP | 2004294377 A | 10/2004 |
| JP | 2004355243 A | 12/2004 |
| JP | 2005531236 A | 10/2005 |

OTHER PUBLICATIONS

Extended European Search Report for EP07713992 Dated Jul. 7, 2012.

* cited by examiner

SYSTEM AND METHOD FOR GROUP-BASED MONITORING OF MOBILE OBJECTS USING A WIRELESS COMMUNICATION NETWORK

TECHNICAL FIELD

The present invention relates to a mobile object monitoring system and a mobile object monitoring method and, more particularly, to a mobile object monitoring system and mobile object monitoring method which use a group communication system such as PoC (Push-to-Talk over Cellular).

BACKGROUND ART

There are known a mobile object monitoring system which monitors a mobile object (e.g., a portable terminal) by detecting the current position of the mobile object and a monitoring method for the system. For example, Japanese Patent Laid-Open No. 2002-281694 (reference 1) discloses a technique of causing a system center to transmit warning information and the current position information of a monitoring target terminal to a monitor terminal when an action area map does not coincide with the current position of the monitoring target terminal. In addition, this reference also discloses that when the distance between the monitoring target terminal and the monitor terminal becomes a predetermined value or more, warning information is transmitted.

Japanese Patent Laid-Open No. 2000-215374 (reference 2) discloses a technique in which when the distance between a terminal communication device attached to a baggage and a PHS (Personal Handyphone System) terminal carried by the owner becomes a predetermined value or more, the PHS terminal generates a warning or the like, and the terminal communication device notifies the PHS terminal of specific information via an existing mobile communication network.

In addition, Japanese Patent Laid-Open No. 2004-294377 (reference 3) discloses a technique of checking whether a portable terminal device can reach a specific position from the current position within a predetermined time, and generating a warning from a monitoring device to the portable terminal device when the portable terminal device exceeds the return limit distance.

Furthermore, Japanese Patent Laid-Open No. 2004-355243 (reference 4) discloses a technique of causing a monitoring target to transmit emergency transmission mail to a monitor and causing the monitor to transmit emergency response mail to the monitoring target.

DISCLOSURE OF INVENTION

Problem to be Solved by the Invention

According to the techniques disclosed in references 1 to 4, when the position of a monitoring target terminal falls outside a predetermined range, it is possible to transmit a warning signal to a monitor terminal. However, it is impossible to transmit a warning signal to a plurality of monitor terminals included in a group.

Assume that a person and a dog (a seeing eye dog or the like) are separated from each other or that young sisters or brothers have lost their ways or someone of a climber's party has strayed away. In the case of such a trouble, there is no means for immediately contacting guardians or a supervisor group.

It is therefore an object of the present invention to transmit a warning signal to a plurality of monitor terminals included in a group when the position of a monitoring target terminal falls outside a predetermined range.

Means of Solution to the Problem

In order to achieve this object, a mobile object monitoring system according to the present invention is characterized by comprising a monitoring target portable terminal, a plurality of monitor portable terminals classified into a plurality of groups, and a relay device which communicates with the monitoring target portable terminal and the monitor portable terminals, wherein the monitoring target portable terminal comprises first control means for performing control to transmit position information of the monitoring target portable terminal to the relay device, and the relay device comprises position information storage means for storing position information transmitted from the monitoring target portable terminal, and second control means for performing control to transmit a group connection request which requests group communication to all monitor portable terminals belonging to a predetermined group when position information is transmitted from the monitoring target portable terminal.

In addition, a mobile object monitoring method according to the present invention is characterized by comprising the steps of causing a monitoring target portable terminal to transmit position information of the monitoring target portable terminal to a relay device which manages group communication between portable terminals, causing the relay device to store position information transmitted from the monitoring target portable terminal in position information storage means, and causing the relay device to transmit a group connection request to request group information to all monitor portable terminals, of a plurality of monitor portable terminals classified into a plurality of groups, which belong to a predetermined group, when position information is transmitted from the monitoring target portable terminal.

Effects of the Invention

According to the present invention, when the position of a monitoring target portable terminal falls outside a predetermined range, it is possible to transmit a warning signal to a plurality of monitor portable terminals included in a group.

BEST MODE FOR CARRYING OUT THE INVENTION

An outline of the present invention will be briefly described first. Assume that a person (for example, a visually handicapped person who needs some help) who owns a GPS (Global Positioning System) portable terminal has strayed from a dog (for example, a seeing eye dog which helps person's sensitive understanding) due to some trouble. A method of informing his/her guardian of the situation will be described below.

First of all, the GPS portable terminal carried by the person monitors the position information of the dog which is made to have a GPS terminal (attached to the dog). When the distance between the person and the dog becomes a predetermined value or more, the GPS portable terminal carried by the person issues a call request to all the members of a guardian group by using PoC communication which allows intragroup communication like that performed by using transceivers. When a response is received from the guardian group, communication can be performed within the group. This allows the guardians to guide the person to a safe place.

In addition, a plurality of groups can be provided, and priority levels can be set for the respective groups in advance. For example, parents are set as group A, and relatives and family members are set as group B (group B includes group A). Group A is called first. If no response is received from group A for a predetermined period of time, a call request is sent to group B in a wider range. Finally, if no one makes any response, members in the groups are informed, by mail, of the latest position information of the person and the place and time where and when the person has strayed.

This makes it possible for the person who has strayed from the dog to automatically and immediately contact a guardian. This communication is not always performed with the guardian but is performed only when the person strays from the dog. This can improve the communication efficiency. In addition, assigning priority levels to groups makes it possible to meet the requirement to solve a problem with the help of only closely related people as possible as it can.

The exemplary embodiments of the present invention will be described below with reference to the accompanying drawings.

[First Exemplary Embodiment]

Figure 1:
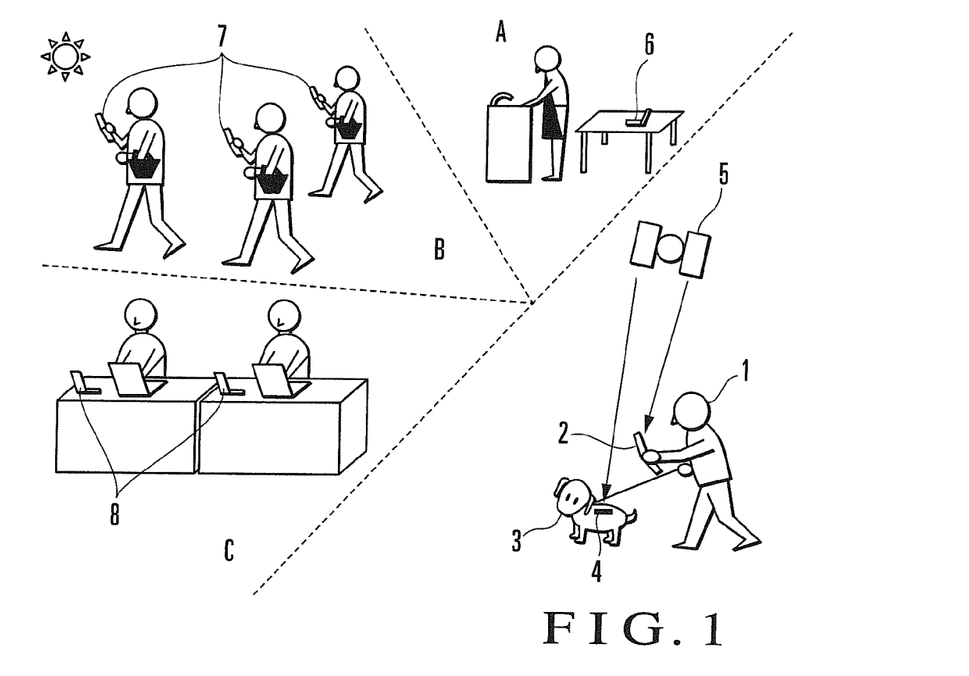
FIG. 1 is a view showing an image depicting a mobile object monitoring system according to the first exemplary embodiment of the present invention.

FIG. 1 is a view showing an image depicting a mobile object monitoring system according to the first exemplary embodiment of the present invention. FIG. 1 illustrates a scene, as an example, in which a person 1 carrying a portable terminal 2 with GPS and PoC functions is leaving home to take a walk together with a dog 3 to which a GPS terminal 4 is attached. The portable terminal 2 of the person 1 is a main portable terminal, and the GPS terminal 4 of the dog 3 is a sub-portable terminal. The portable terminal 2 and the GPS terminal 4 constitute a monitoring target portable terminal. FIG. 1 also illustrates a GPS satellite 5 as the communication destination of the GPS.

As monitor groups, for example, groups A, B, and C are set in different places. Groups A, B, and C are respectively provided with PoC terminals 6, 7, and 8. The PoC terminals 6 to 8 are monitor portable terminals.

Figure 2:
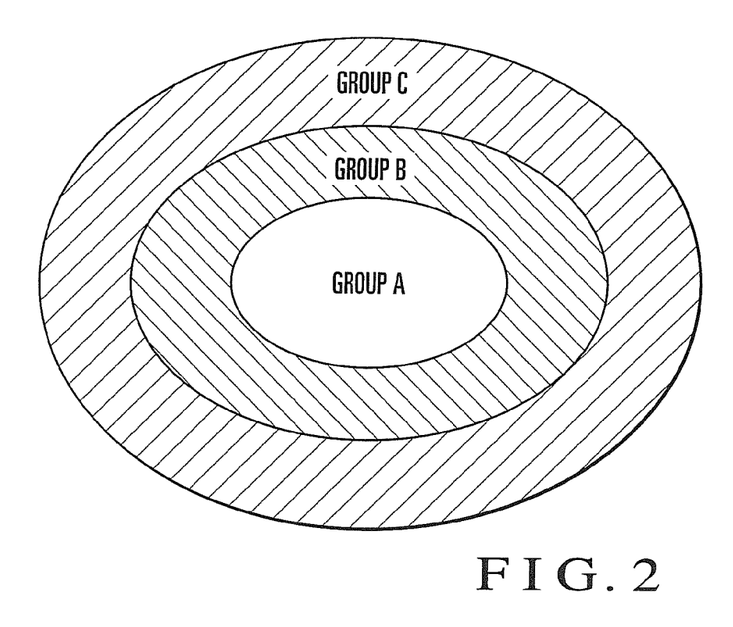
FIG. 2 is a schematic view showing an example of the definition ranges of groups.

As shown in FIG. 2, the definition ranges of groups A to C are set such that group A (e.g., parents) is located in the central range, group B (e.g., relatives and family members) is located in a wider range, and group C (e.g., friends) is located in a more wider range.

Priority levels are set for these groups, respectively, in advance. FIG. 2 shows that the highest priority level, the next highest priority level, and the lowest priority level are respectively assigned to groups A, B, and C.

Figure 3:
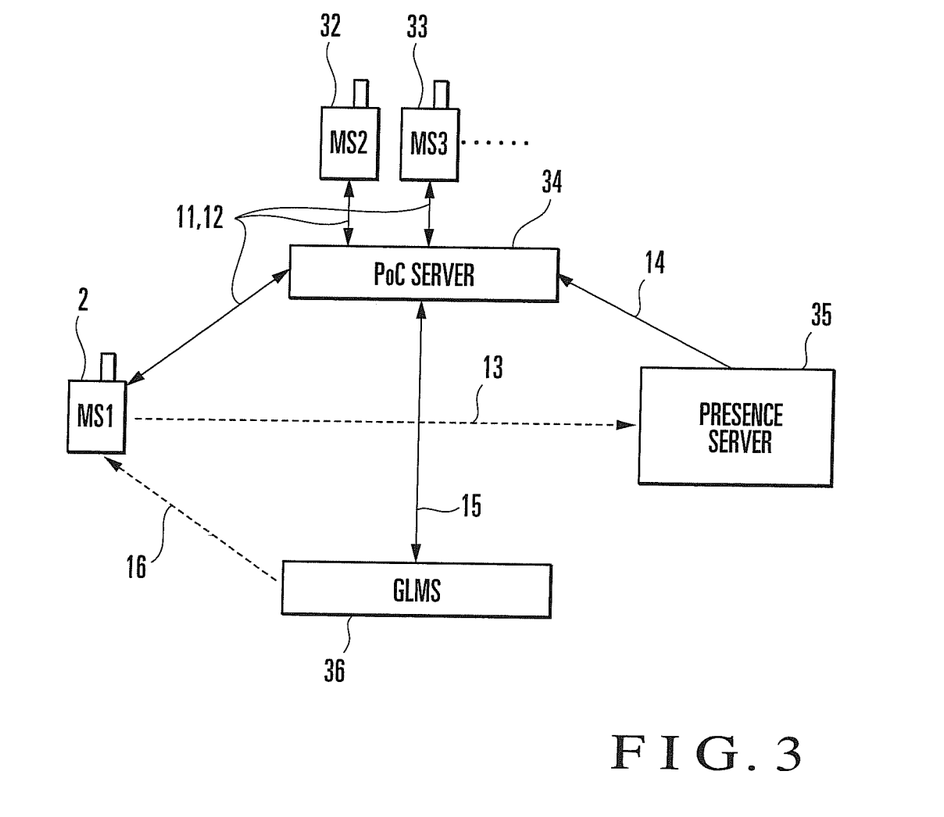
FIG. 3 is a block diagram showing an example of the arrangement of the mobile object monitoring systems shown in FIG. 1.

As shown in FIG. 3, the mobile object monitoring system according to this exemplary embodiment comprises a portable terminal (MS1) 2 of a user as a mobile object, portable terminals (MS2) 32 and (MS3) 33 of other users in the same group, a PoC server 34, a presence server 35, and a GLM server (GLMS: Group and List Management Server) 36. Note that the portable terminals 32 and 33 correspond to the PoC terminals 6 to 8 in FIG. 1.

The PoC server 34 is a relay device which manages speech data 11 and image data 12 between the portable terminals 2, 32, and 33, and transmits/receives terminal data to/from the portable terminals 2, 32, and 33.

The presence server 35 is a user database storing user information 13 of the portable terminal 2, and transmits information (presence information 14) about the user to the PoC server 34.

The GLM server 36 is another user information database storing user information 15 of the cellular phones 32 and 33 in the same group. The GLM server 36 exchanges the user information 15 with the PoC server 34, and transmits user information (group information 16) in the same group to the portable terminal 2.

The user information 15 stored in the GLM server 36 contains information such as the contact addresses of the cellular phones 32 and 33, the identifier (for discriminating groups A to C) of the group to which the cellular phones 32 and 33 belong, and the priority level of each group.

The portable terminal 2 transmits a call request within the same group and position/time information.

Figure 4:
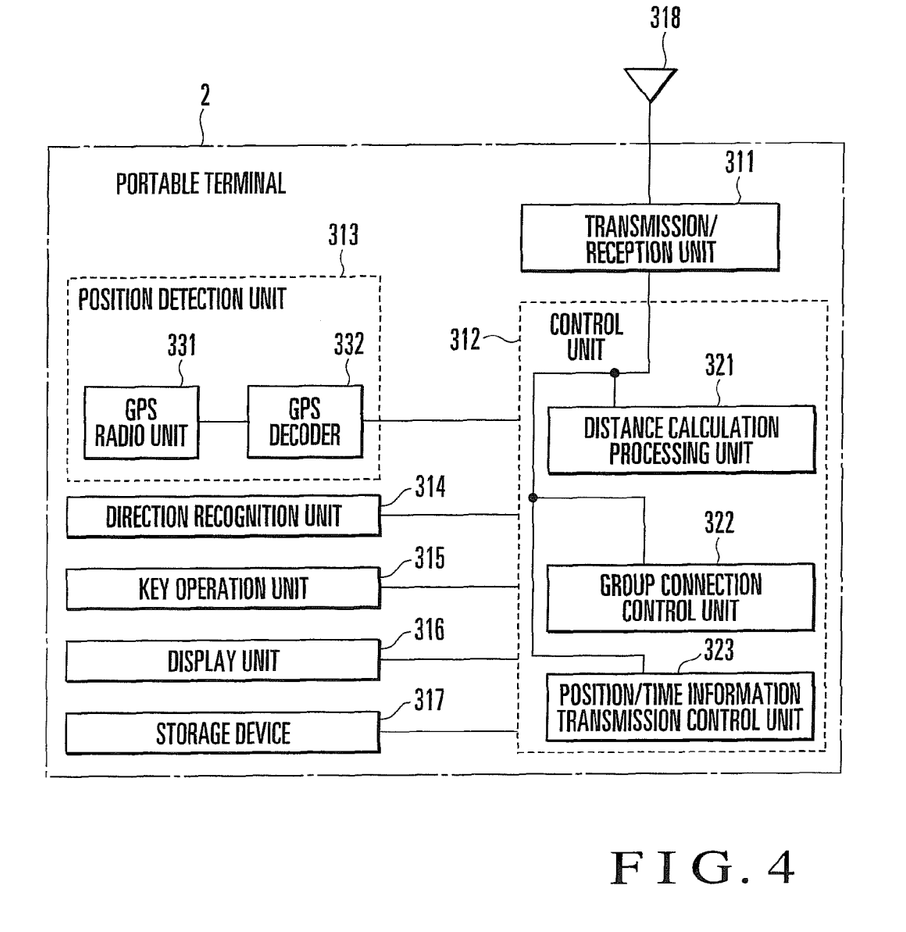
FIG. 4 is a block diagram showing an example of the arrangement of a portable terminal carried by a person.

The arrangement of the portable terminal 2 carried by the person 1 will be described with reference to FIG. 4. Note that the portable terminals 32 and 33 have arrangements similar to the arrangement of the portable terminal 2.

The portable terminal 2 comprises a transmission/reception unit 311, a control unit 312, a position detection unit 313, a direction recognition unit 314, a key operation unit 315, a display unit 316, a storage device 317, and an antenna 318.

The transmission/reception unit 311 has a function of transmitting/receiving data via a network.

The position detection unit (second position detection means) 313 detects the current position of the portable terminal 2, and includes a GPS wireless unit 331 and a GPS decoder 332. The GPS wireless unit 331 receives a GPS signal from the GPS satellite 5 (see FIG. 1). The GPS decoder 332 then detects the current position of the portable terminal 2 on the basis of the received GPS signal.

The direction recognition unit 314 detects the direction of the portable terminal 2, and is implemented by, for example, a magnetic sensor which detects magnetic energy.

The key operation unit 315 is an operation unit for keys for inputting information.

The display unit 316 is a portion which displays information.

The storage device 317 is a work area for the control unit 312, and stores information necessary for control performed by the control unit 312.

The control unit 312 includes a distance calculation processing unit 321, a group connection control unit 322, and a position/time information transmission control unit 323. The distance calculation processing unit 321 calculates the distance from the current position of the person 1 (see FIG. 1) to that of the dog 3 (see FIG. 1), and monitors whether the distance exceeds a predetermined distance or the like. The group connection control unit 322 generates a group connection request signal to start PoC communication within the group, and transmits the group connection request signal to the PoC server 34 (see FIG. 3) via the transmission/reception unit 311 and the antenna 318. The position/time information transmission control unit 323 performs control to transmit the current position information of the person 1 and information indicating the time when the current position was detected to the PoC server 34 (see FIG. 3) via the transmission/reception unit 311 and the antenna 318.

The antenna 318 is an antenna which transmits/receives information.

Figure 5:
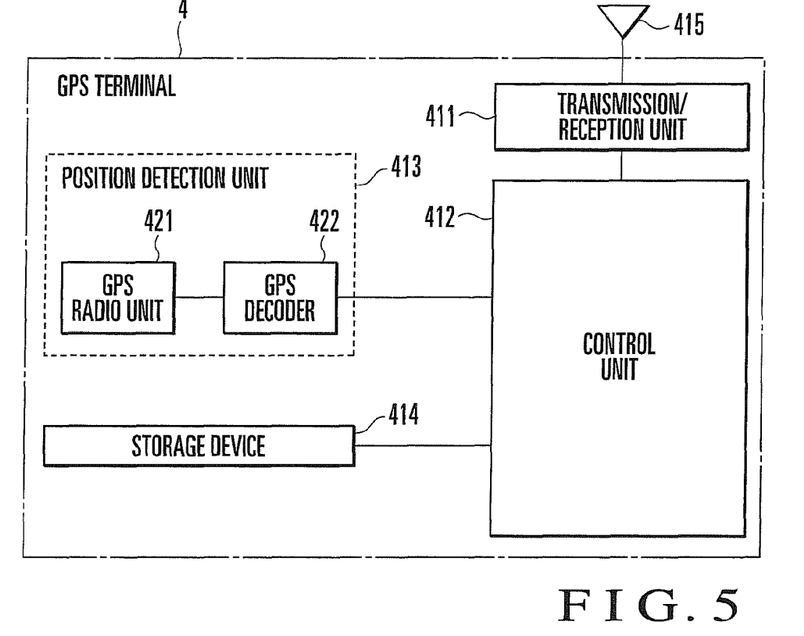
FIG. 5 is a block diagram showing an example of the arrangement of a GPS terminal 4 attached to a dog.

The arrangement of the GPS terminal 4 (see FIG. 1) attached to the dog 3 will be described with reference to FIG. 5. The GPS terminal 4 comprises a transmission/reception unit 411, a control unit 412, a position detection unit 413, a storage device 414, and an antenna 415.

The position detection unit (first position detection means) 413 detects the current position of the portable terminal 4. In this unit, a GPS wireless unit 421 receives a GPS signal from the GPS satellite 5 (see FIG. 1), and a GPS decoder 422 detects the current position of the portable terminal 4 on the basis of the received. GPS signal.

The control unit 412 transmits the detected current position information of the portable terminal 4 to the portable terminal 2 of the person 1 via the transmission/reception unit 411 and the antenna 415.

The storage device 414 is a work area for the control unit 412, and stores information necessary for control performed by the control unit 412.

Figure 6:
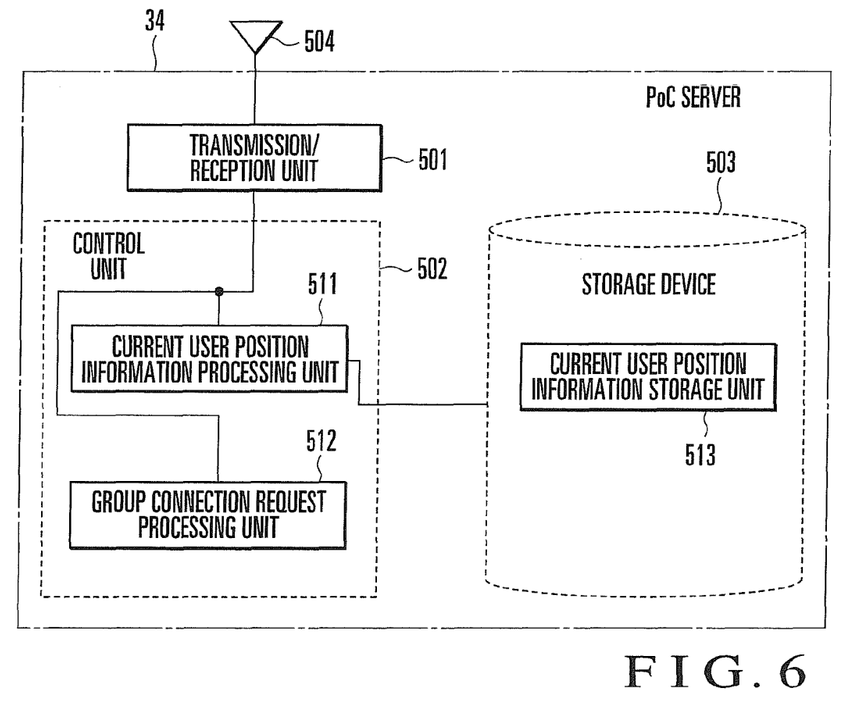
FIG. 6 is a block diagram showing an example of the arrangement of a PoC server.

The arrangement of the PoC server 34 will be described with reference to FIG. 6. The PoC server 34 comprises a transmission/reception unit 501, a control unit 502, a storage device 503, and an antenna 504.

The control unit 502 includes a current user position information processing unit 511 and a group connection request processing unit 512.

The storage device 503 includes a current user position information storage unit 513.

The transmission/reception unit 501 receives the position information of the user. The current user position information processing unit 511 of the control unit 502 manages the received position information. The position information is stored in the current user position information storage unit 513 of the storage device 503.

When a user transmits a group connection request signal, the transmission/reception unit 501 receives this signal via the antenna 504. The group connection request processing unit 512 of the control unit 502 receives the group connection request signal and determines a specific user to which connection is to be made. The group connection request processing unit 512 then transmits the group connection request signal to the determined user to which connection is to be made via the transmission/reception unit 501 and the antenna 504.

Figure 7:
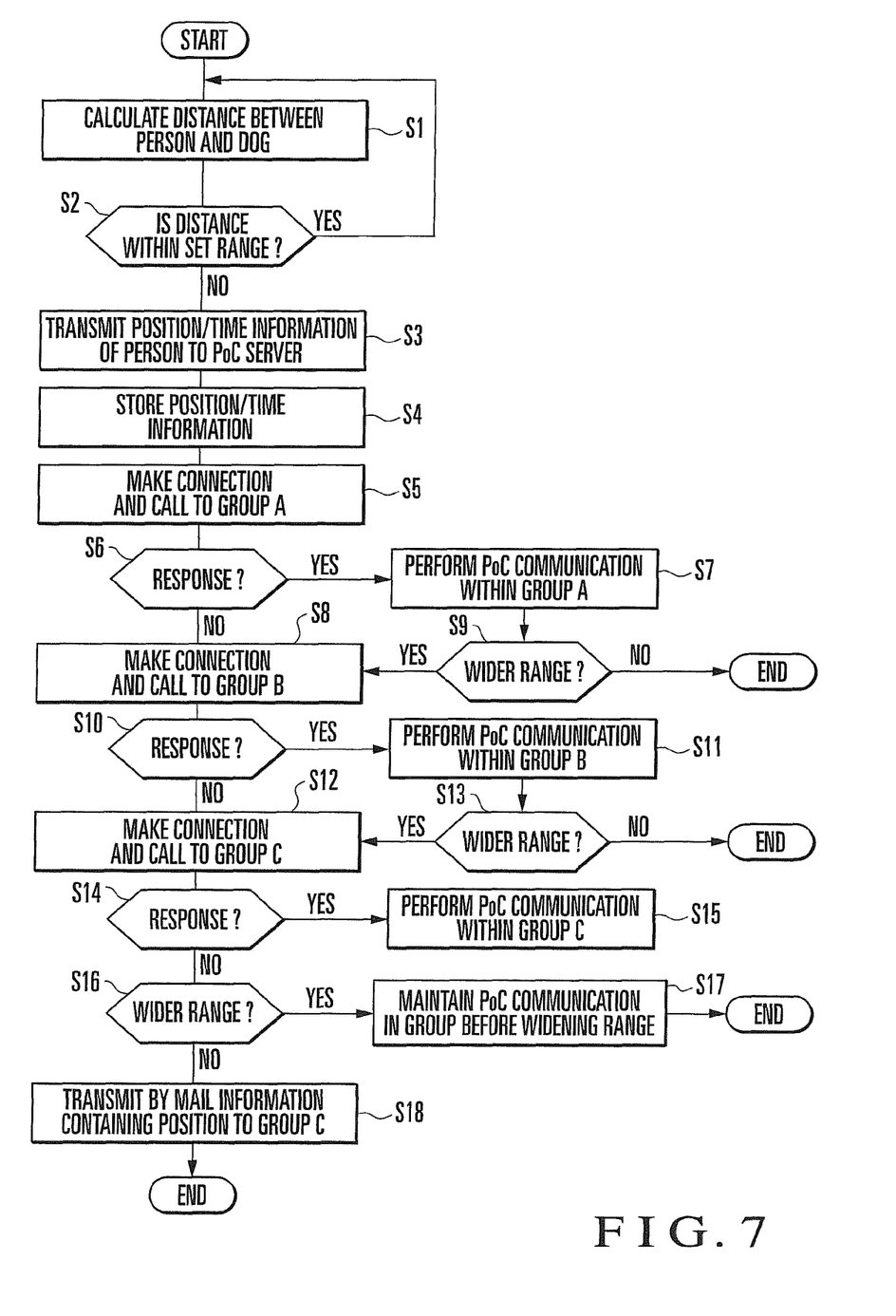
FIG. 7 is a flowchart showing the operation of the mobile object monitoring system shown in FIG. 1.

The operation of the mobile object monitoring system according to this exemplary embodiment will be described next with reference to FIG. 7.

The portable terminal 2 carried by the person 1 acquires the position information of the dog 3 transmitted from the GPS terminal 4 via the transmission/reception unit 311. The position detection unit 313 also detects the position information of the person 1. The distance calculation processing unit 321 of the control unit 312 calculates the distance between the two terminals 2 and 4, i.e., the person 1 and the dog 3, from two pieces of position information (step S1).

If the distance obtained by the distance calculation processing unit 321 falls within a predetermined distance (YES in step S2), the process returns to step S1 again, in which the control unit 312 monitors the position information of the person 1 and the position information of the dog 3.

If the obtained distance exceeds the predetermined distance (NO in step S2), the position/time information transmission control unit 323 of the control unit 312 transmits the position information and time information of the person 1 to the PoC server 34 via the transmission/reception unit 311 (step S3).

In the PoC server 34, the current user position information processing unit 511 processes the position information and time information of the person 1 which are received via the transmission/reception unit 501, and the current user position information storage unit 513 then stores the processed information (step S4).

The group connection control unit 322 of the portable terminal 2 carried by the person 1 automatically generates a group connection request signal and transmits it to the PoC server 34 via the transmission/reception unit 311. The group connection request processing unit 512 of the PoC server 34 transmits a group connection request signal to all the portable terminals belonging to group A with the highest priority level by referring to the user information 15 obtained from the GLM server 36 (step S5).

If a response is received from a portable terminal belonging to group A (YES in step S6), PoC communication is performed within group A (step S7).

If no response is received from any portable terminals belonging to group A (NO in step S6), the group connection request processing unit 512 of the PoC server 34 transmits a group connection request signal to all the portable terminals belonging to group B with the highest priority level next to that of group A by referring to the user information 15 again (step S8).

When PoC communication is maintained in group A in step S7 and is to be extended to a wider group range (YES in step S9), it is possible to make connection and a call to group B (step S8).

When PoC communication is maintained in group A in step S7 and is not be extended to a more wider group range (NO in step S9), the operation is terminated.

If a response to the transmission in step S8 is received from a portable terminal belonging to group B (YES in step S10), PoC communication is performed within group B (step S11).

If no response is received from any portable terminals belonging to group B (NO in step S10), the group connection request processing unit 512 of the PoC server 34 transmits a group connection request signal to all the portable terminals belonging to group C with the highest priority level next to that of group B by referring to the user information 15 again (step S12).

When PoC communication is maintained in group B in step S11 and is to be extended to a more wider group range (YES in step S13), it is possible to make connection and a call to group C (step S12).

When PoC communication is maintained in group B in step S11 and is not be extended to a wider group range (NO in step S13), the operation is terminated.

If a response to the transmission in step S12 is received from a portable terminal belonging to group C (YES in step S14), PoC communication is performed within group C (step S15).

If no response is received from any portable terminals belonging to group C when the communication is to be extended to a wider group range in step S13 (NO in step S14 and YES in step S16), the PoC communication in group B before it is extended is maintained (step S17), and the operation is terminated.

If no response is received from any portable terminals belonging to group C (NO in step S14) and the communication is not extended to a wider group range (NO in step S16), since group C is the largest group, the current user position information processing unit 511 of the PoC server 34 transmits the position information and time information of the person 1 stored in the current user position information storage unit 513 to all the portable terminals belonging to group C (step S18). The operation is then terminated.

Note that the portable terminal 2 of the person 1 is configured to output both information from the position detection unit 313 and information from the direction recognition unit 314 to the control unit 312. For this reason, after group communication (PoC communication), a guardian can acquire and monitor both the position information of the person 1 and the direction information of the person 1 in real time. The guardian can also guide the person 1 by using the position information and the direction information.

According to this exemplary embodiment, the person 1 who has been separated from the dog 3 can automatically and immediately contact a guardian group. This communication is not always performed with the guardian group but is performed only when the person 1 is separated from the dog 3. This can improve the communication efficiency. In addition, assigning priority levels to groups makes it possible to meet the requirement to solve a problem with the help of only closely related people as possible as it can. In addition, it is possible to issue a connection request to a group in a range wider than that of the group to which a connection request has been issued.

[Second Exemplary Embodiment]

Figure 8:
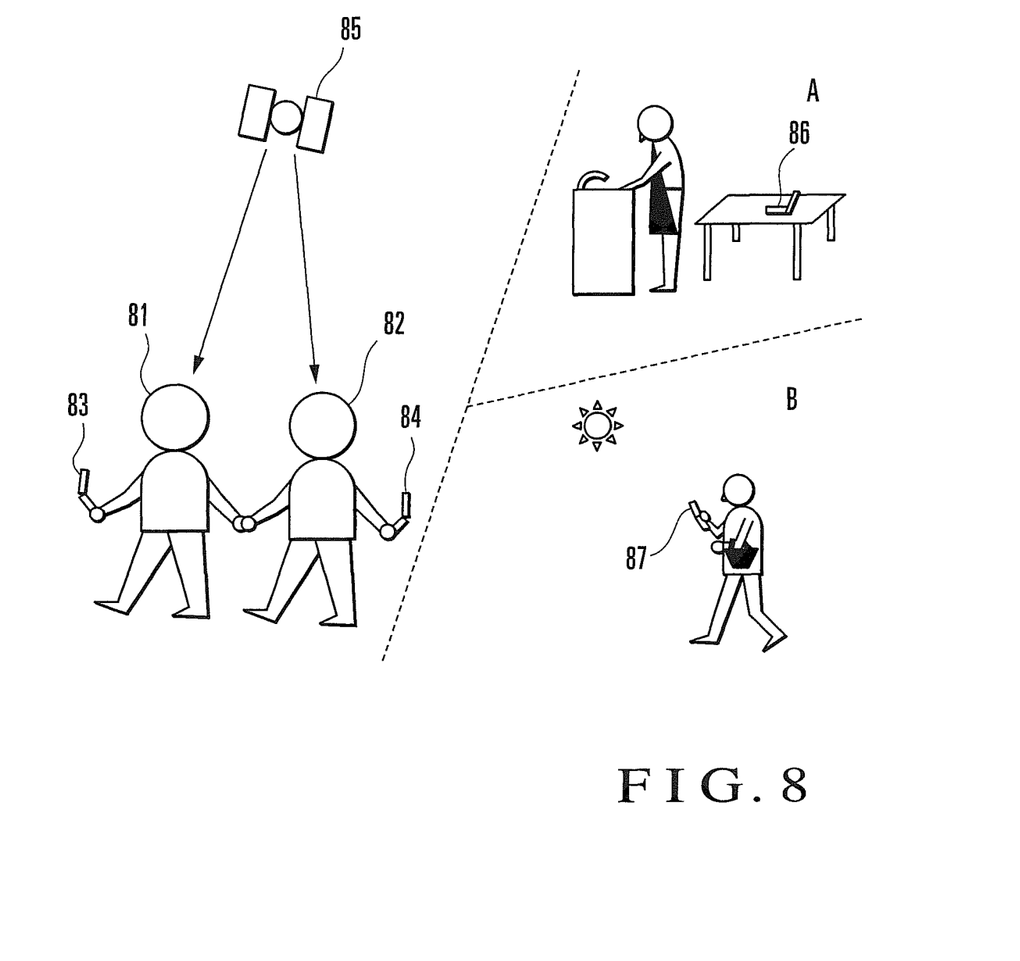
FIG. 8 is a view showing an image depicting a mobile object monitoring system according to the second exemplary embodiment of the present invention.

FIG. 8 is a view showing an image depicting a mobile object monitoring system according to the second exemplary embodiment of the present invention. FIG. 8 illustrates, for example, a person 81 carrying a portable terminal 83 with GPS and PoC functions and a person 82 carrying a portable terminal 84 with GPS and PoC functions. The persons 81 and 82 are assumed to be brothers or sisters. This view also depicts a GPS satellite 85 as a GPS communication destination.

This view also depicts a portable terminal 86 belonging to group A and a portable terminal 87 belonging to group B.

This exemplary embodiment differs from the first exemplary embodiment only in that the persons 81 and 82 replace the person 1 and the dog 3, and is the same as the first exemplary embodiment in terms of arrangement and operation. Therefore, a description of the arrangement and operation of the exemplary embodiment will be omitted.

According to this exemplary embodiment, if, for example, young brothers or sisters are separated from each other (for example, it is highly possible that they have become stray children), it is possible to automatically and immediately contact their guardian.

This technique can also be applied to climbers and their guardians and the like.

[Third Exemplary Embodiment]

A mobile object monitoring system according to the third exemplary embodiment of the present invention keeps transmitting a group connection request to a cellular phone belonging to one group. If no response is received even after the group connection request signal is transmitted a given number of times or more, the system transmits by mail the position information and time information of a person 1 or the like to a guardian.

In addition, when reconnection cannot be made from a portable terminal 2 of the person 1 due to battery exhaustion, out-of-range, or the like while the connection request is repeatedly output, the system transmits by mail the position information and time information of the person 1 or the like to the guardian in the same manner as described above.

Note that since the arrangement of the mobile object monitoring system according to this exemplary embodiment is the same as that of the first exemplary embodiment, a repetitive description will be omitted.

Figure 9:
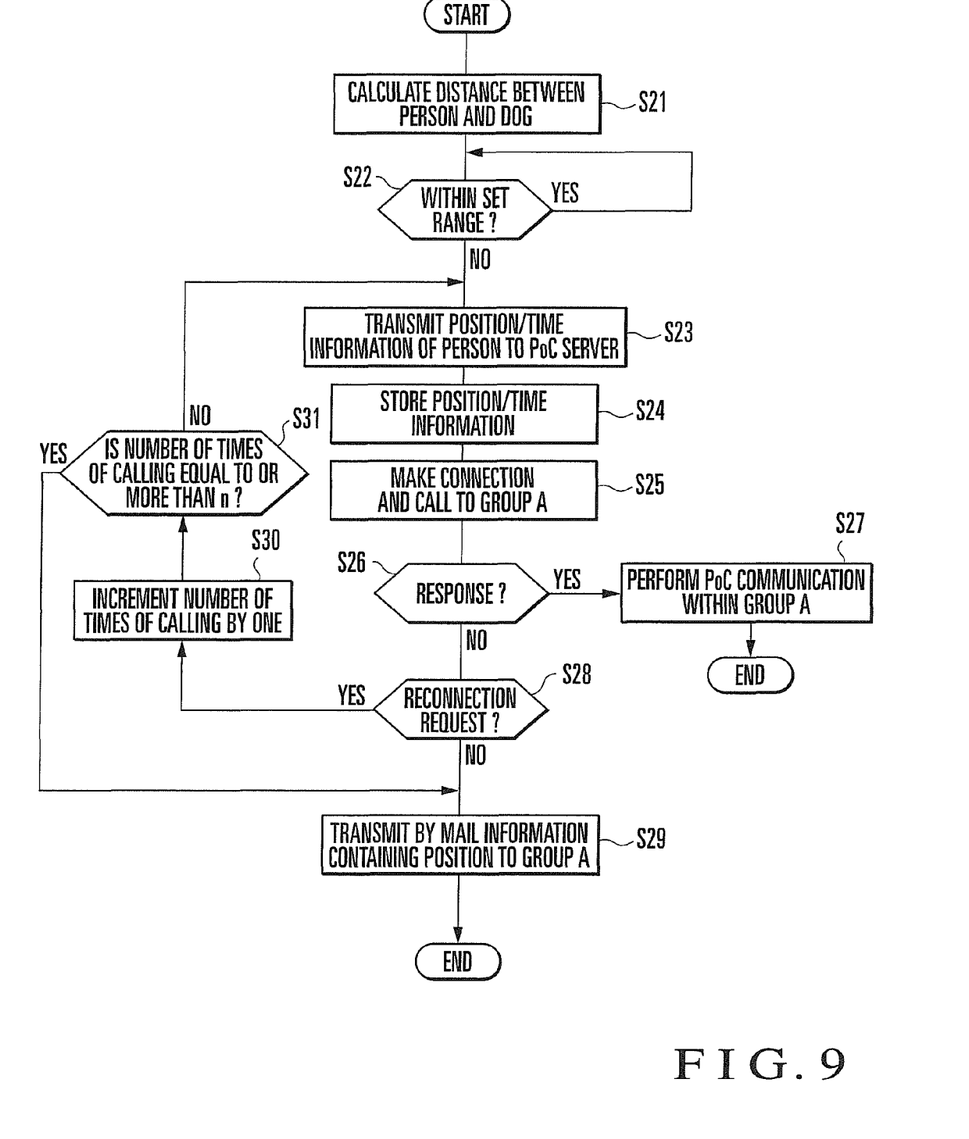
FIG. 9 is a flowchart showing the operation of a mobile object monitoring system according to the third exemplary embodiment of the present invention.

The operation of the mobile object monitoring system according to this exemplary embodiment will be described next with reference to FIG. 9.

The portable terminal 2 of the person 1 acquires, via a transmission/reception unit 311, the position information of a dog 3 transmitted from a GPS terminal 4. A position detection unit 313 also detects the position information of the person 1. A distance calculation processing unit 321 of a control unit 312 then calculates the distance between the two terminals 2 and 4, i.e., the person 1 and the dog 3, from the two pieces of position information (step S21).

If the distance obtained by the distance calculation processing unit 321 is within a predetermined distance (YES in step S22), the process returns to step S1 again, in which the control unit 312 monitors the position information of the person 1 and the position information of the dog 3.

If the obtained distance exceeds the predetermined distance (NO in step S22), a position/time information transmission control unit 323 of the control unit 312 transmits the position information and time information of the person 1 to a PoC server 34 via the transmission/reception unit 311 (step S23).

The position information and time information of the person 1 received by the PoC server 34 via a transmission/reception unit 501 are processed by a current user position information processing unit 511 and stored in a current user position information storage unit 513 (step S24).

A group connection control unit 322 of the portable terminal 2 carried by the person 1 then automatically generates a group connection request signal and transmits it to the PoC server 34 via the transmission/reception unit 311. A group connection request processing unit 512 of the PoC server 34 transmits the group connection request signal to all the portable terminals belonging to group A with the highest priority level by referring to user information 15 obtained from a GLM server 36 (step S25).

If a response is received from a portable terminal belonging to group A (YES in step S26), PoC communication is performed within group A (step S27). The operation is then terminated.

If no response is received from any portable terminals belonging to group A (NO in step S26), and the group connection request signal is not retransmitted from the portable terminal 2 of the person 1 (NO in step S28), the current user position information processing unit 511 of the PoC server 34 transmits by mail the position information and time information of the person 1 stored in the current user position information storage unit 513 to all the portable terminals belonging to group A (step S29). The operation is then terminated.

In contrast to this, if no response is received from any portable terminals belonging to group A (NO in step S26) and a group connection request signal is retransmitted from the portable terminal 2 of the person 1 (YES in step S28), a control unit 502 of the PoC server 34 increments the number of times of calling by one (step S30).

The control unit 502 of the PoC server 34 determines whether the number of times of calling is equal to or more than a predetermined number n (n is a positive integer) of times of calling. If the number of times of calling is less than the predetermined number n of times of calling (NO in step S31), the control unit 502 of the PoC server 34 receives the position information and time information of the person 1 which are retransmitted from the portable terminal 2 (step S23).

Subsequently, steps S24 to S28 described above are repeated.

In contrast, if the number of times of calling is equal to or more than the number n of times of calling (YES in step S31), the current user position information processing unit 511 of the PoC server 34 transmits by mail the position information and time information of the person 1 stored in the current user position information storage unit 513 to all the portable terminals belonging to group A (step S29). The operation is then terminated.

Assume that no response is received from any portable terminals belonging to group A (NO in step S26) and a group connection request signal is retransmitted from the portable terminal 2 of the person 1 (YES in step S28). Even in this case, if the group connection request signal has not reached the PoC server 34 due to the battery exhaustion of the portable terminal 2, out-of-range, or the like, the PoC server 34 determines that the portable terminal 2 has issued no reconnection request (NO in step S28). The current user position information processing unit 511 of the PoC server 34 transmits by mail the position information and time information of the person 1 stored in the current user position information storage unit 513 to the portable terminals belonging to group A (step S29). The operation is then terminated.

According to this exemplary embodiment, even if the portable terminal 2 of the person 1 is disconnected during communication due to battery exhaustion, out-of-range, or the like, the latest position information can be transmitted to a guardian. In addition, limiting the number of times of calling allows various users to implement user-friendly settings.

[Fourth Exemplary Embodiment]

A mobile object monitoring system according to the fourth exemplary embodiment of the present invention uses, as group communication techniques, "short Message Service" (to be written as "SMS" hereinafter) which is a service of transmitting and receiving character messages and "Multi Party Call" which allows group communication.

The fourth exemplary embodiment differs from the first exemplary embodiment described above in that group communication is performed by using SMS and Multi Party Call. Since SMS and Multi Party Call are existing systems, a description of the arrangements of the systems will be omitted.

According to an outline of operation, when issuing a group communication request, this system accesses a group by Multi Party Call. If no response is received finally, the system notifies, by SMS, the group of the position information and time information of the person 1 stored in a current user position information storage unit 513.

According to this exemplary embodiment, it is possible to use, as group communication techniques, SMS and Multi Party Call which are existing systems.

The invention claimed is:

1. A mobile object monitoring system comprising: a monitoring target portable terminal; a plurality of monitor portable terminals classified into a plurality of groups; and a relay device which communicates with said monitoring target portable terminal and said monitor portable terminals, wherein said monitoring target portable terminal comprises a first control unit which performs control to transmit position information of said monitoring target portable terminal to said relay device, and said relay device comprises hardware, a position information storage unit implemented by the hardware and which stores position information transmitted from said monitoring target portable terminal, and a second control unit implemented by the hardware and which performs control to transmit a group connection request which requests group communication to all monitor portable terminals belonging to a predetermined group when position information is transmitted from said monitoring target portable terminal, wherein a priority level is set for each of said plurality of groups to which said plurality of monitor portable terminals belong as classified, each of said plurality of groups, other than a group having a highest priority level, includes a group having a priority level higher than a priority level thereof, and said second control unit performs a controlling function to transmit a group connection request to said plurality of monitor portable terminals in the descending order of the priority level first from those monitor portable terminals that belong to one of said plurality of groups that has a highest priority level thereamong, wherein said second control unit performs control to transmit position information stored in said position information storage unit to all monitor portable terminals belonging to a group with a lowest priority level, when no response is received from any monitor portable terminals belonging to the group with the lowest priority level.

2. A mobile object monitoring system according to claim 1, wherein, for each monitor portable terminal as a given monitor portable terminal, a priority level is set for each group belonging to said given monitor portable terminal, and said second control unit performs control to transmit a group connection request to all monitor portable terminals belonging to a group with a highest priority level when position information is transmitted from said monitoring target portable terminal.

3. A mobile object monitoring system according to claim 2, wherein when no response is received from any monitor portable terminals belonging to a group to which a group connection request has been transmitted, said second control unit performs control to transmit a group connection request to all monitor portable terminals belonging to a group with a next highest priority level.

4. A mobile object monitoring system according to claim 1, wherein when no response is received from any monitor portable terminals belonging to a group to which a group connection request has been transmitted, said second control unit performs control to repeatedly transmit a group connection request to monitor portable terminals belonging to the same group a predetermined number of times.

5. A mobile object monitoring system according to claim 1, wherein as a communication unit in a group, one of "Push-to-Talk over Cellular", "Multi Party Call", and "Short Message Service" is used.

6. A mobile object monitoring method comprising the steps of: causing a monitoring target portable terminal to transmit position information of the monitoring target portable terminal to a relay device which manages group communication between portable terminals;

causing the relay device to store position information transmitted from the monitoring target portable terminal in a position information storage unit;

causing the relay device to transmit a group connection request to request group information to all monitor portable terminals, of a plurality of monitor portable terminals classified into a plurality of groups, which belong to a predetermined group, when position information is transmitted from the monitoring target portable terminal, wherein     a priority level is set for each of said plurality of groups to which said plurality of monitor portable terminals belong as classified,     each of said plurality of groups, other than a group having a highest priority level, includes a group having a priority level higher than a priority level thereof, and     a controlling function is performed to transmit a group connection request to said plurality of monitor portable terminals in the descending order of the priority level first from those monitor portable terminals that belong to one of said plurality of groups that has a highest priority level thereamong, wherein the step of causing the relay device to transmit a group connection request further comprises the step of transmitting position information stored in the position information storage unit to monitor portable terminals belonging to a group with a lowest priority level, when no response is received from any monitor portable terminals belonging to the group with the lowest priority level.

7. A mobile object monitoring method according to claim 6, wherein the step of causing the relay device to transmit a group connection request comprises the step of transmitting a group connection request to all monitor portable terminals belonging to a group with a highest priority level among priority levels set for groups to which the monitor portable terminals belong, when position information is transmitted from the monitoring target portable terminal.

8. A mobile object monitoring method according to claim 7, wherein the step of causing the relay device to transmit a group connection request further comprises the step of, when no response is received from any monitor portable terminals belonging to a group to which a group connection request has been transmitted, transmitting a group connection request to all monitor portable terminals belonging to a group with a next highest priority level.

9. A mobile object monitoring method according to claim 6, wherein the step of causing the relay device to transmit a group connection request comprises the step of, when no response is received from any monitor portable terminals belonging to a group to which a group connection request has been transmitted, repeatedly transmitting a group connection request to a monitor portable terminal belonging to the same group a predetermined number of times.

10. A mobile object monitoring method according to claim 6, further comprising the step of performing group communication by using one of "Push-to-Talk over Cellular", "Multi Party Call", and "Short Message Service".

11. A mobile object monitoring system comprising: a monitoring target portable terminal; a plurality of monitor portable terminals classified into a plurality of groups; and     a relay device which communicates with said monitoring target portable terminal and said monitor portable terminals, wherein     said monitoring target portable terminal comprises first control means for performing control to transmit position information of said monitoring target portable terminal to said relay device, and said relay device comprises     position information storage means for storing position information transmitted from said monitoring target portable terminal, and     second control means for performing control to transmit a group connection request which requests group communication to all monitor portable terminals belonging to a predetermined group when position information is transmitted from said monitoring target portable terminal, wherein     a priority level is set for each of said plurality of groups to which said plurality of monitor portable terminals belong as classified,     each of said plurality of groups, other than a group having a highest priority level, includes a group having a priority level higher than a priority level thereof, and     said second control means performs a controlling function to transmit a group connection request to said plurality of monitor portable terminals in the descending order of the priority level first from those monitor portable terminals that belong to one of said plurality of groups that has a highest priority level thereamong, wherein said second control means performs control to transmit position information stored in said position information storage means to all monitor portable terminals belonging to a group with a lowest priority level all groups, when no response is received from any monitor portable terminals belonging to the group with the lowest priority level.

\* \* \* \* \*